May 21, 1968
C. L. AUSTIN
3,383,774
APPARATUS AND METHOD FOR TREATING PULVERULENT
OR GRANULAR MATERIAL
Filed Dec. 23, 1965
3 Sheets-Sheet 1
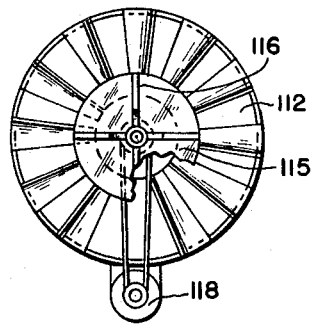
FIG. 7
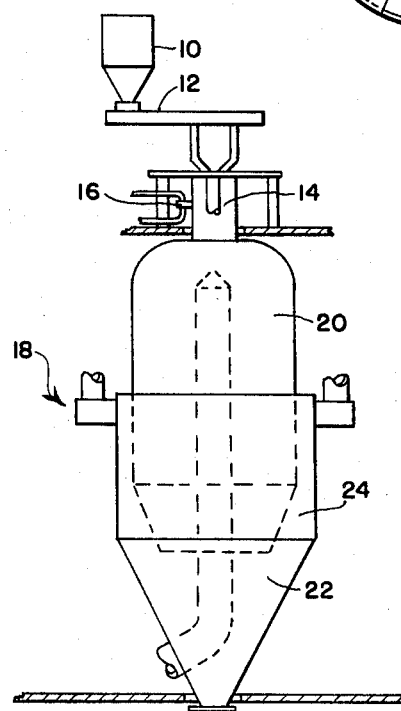
FIG. 1
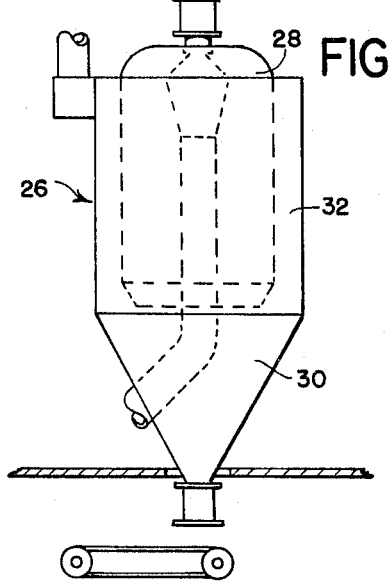
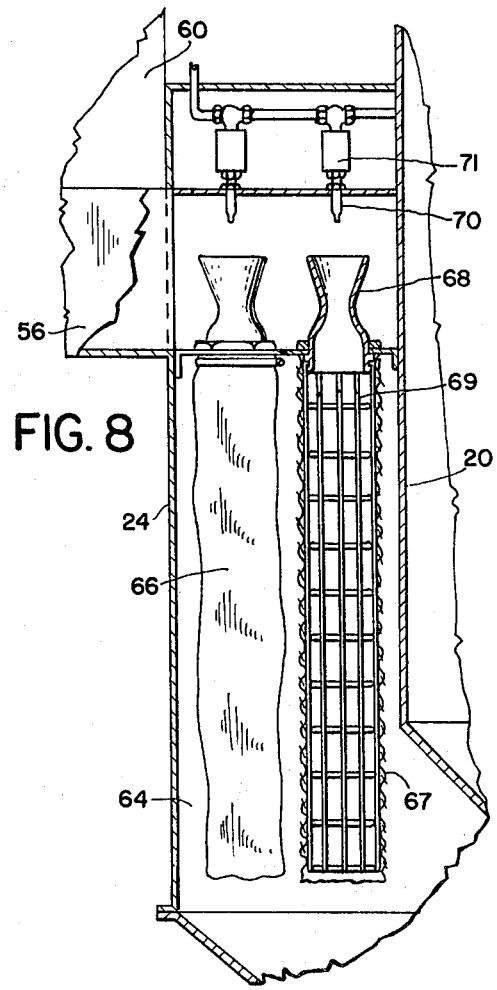
FIG. 8
INVENTOR.
CURTIS L. AUSTIN
BY
*L. Messay Lillehaugen*
ATTORNEY May 21, 1968
C. L. AUSTIN
3,383,774
APPARATUS AND METHOD FOR TREATING PULVERULENT
OR GRANULAR MATERIAL
Filed Dec. 23, 1965
3 Sheets-Sheet 2
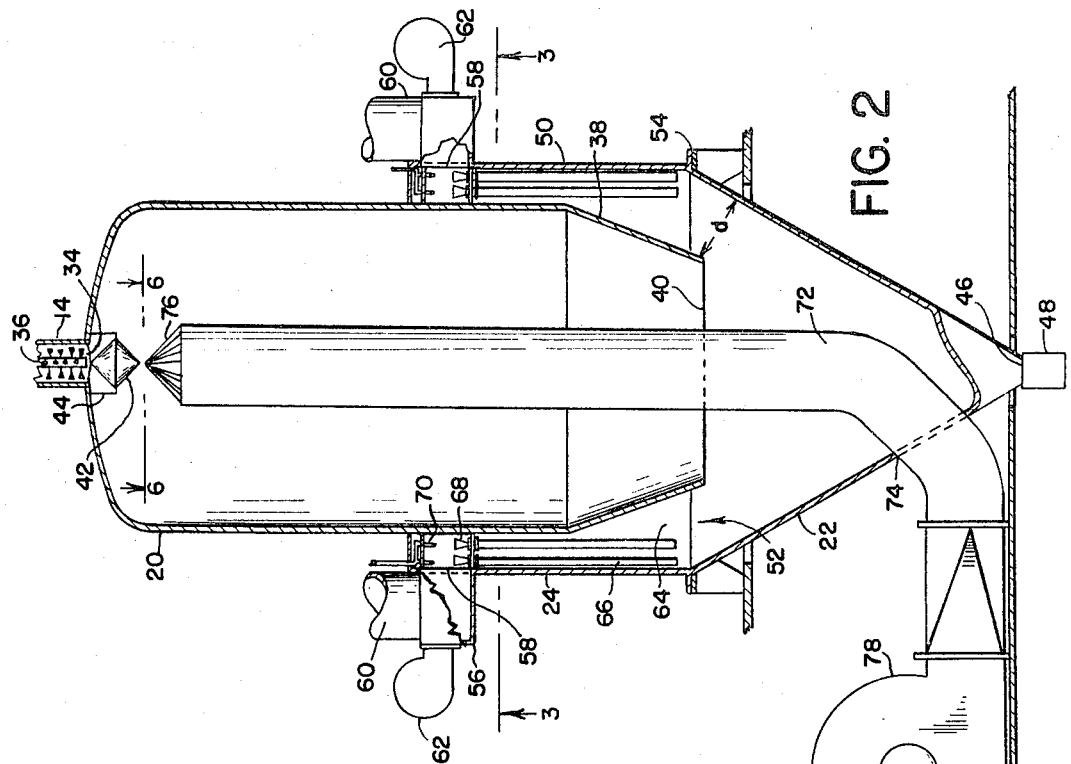
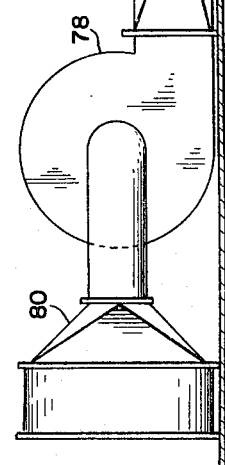
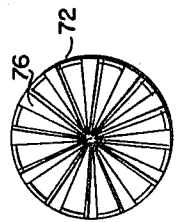
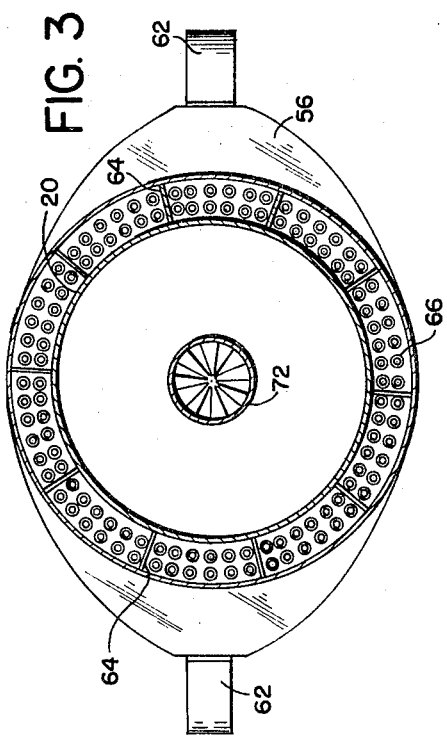
INVENTOR.
CURTIS L. AUSTIN
BY
ATTORNEY

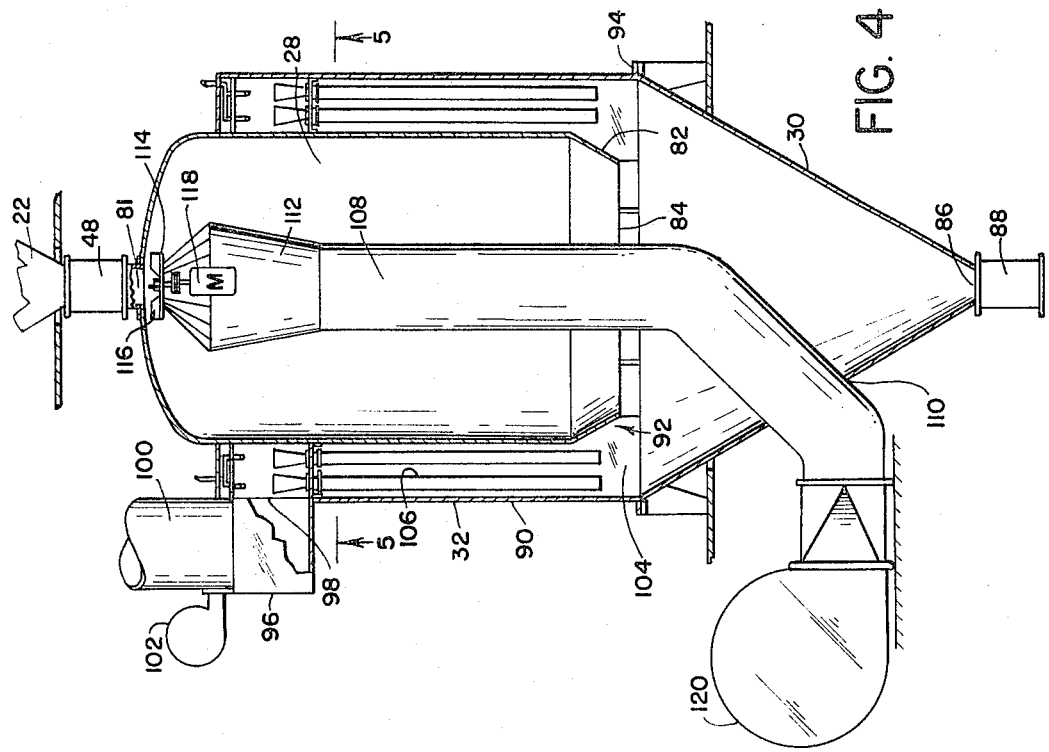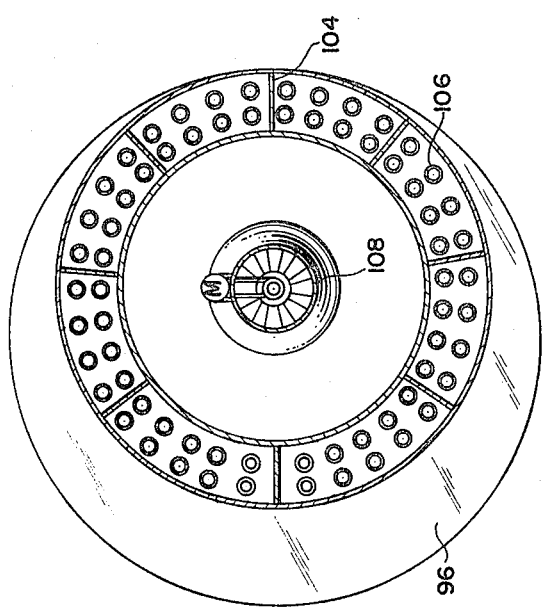

United States Patent Office 3,383,774
Patented May 21, 1968

3,383,774
APPARATUS AND METHOD FOR TREATING PULVERULENT OR GRANULAR MATERIAL
Curtis L. Austin, Minneapolis, Minn., assignor to General Mills, Inc., a corporation of Delaware
Filed Dec. 23, 1965, Ser. No. 516,030
13 Claims. (Cl. 34—10)

ABSTRACT OF THE DISCLOSURE

An apparatus and method for drying and/or cooling particles of material with a gaseous medium. A dust collector unit which includes a plurality of tubular filter elements, surrounds a main drying or cooling chamber in such a manner that the interior of the unit communicates with the interior of the chamber. Heated or cooled air, and the material to be treated are introduced through separate openings into the chamber; the particles are removed from the bottom of the chamber, while the air is exhausted through the dust collector unit where entrained particles are collected.

---

This invention relates to an apparatus and a method for treating pulverulent or granular material with a gaseous medium, and more particularly to a drying and/or cooling apparatus for drying and/or cooling particles of material with a gaseous medium, such as air. The apparatus includes a dust collecting unit which forms an integral part of the apparatus, for collecting dust particles entrained in the gaseous medium, as the gaseous medium is removed from the apparatus.

Drying and/or cooling chambers are well known in the art for drying or cooling pulverulent and granular materials. Such equipment normally includes a chamber into which both the material to be treated, and a heated or cooled gaseous medium, such as air, is admitted. Separate inlet and outlet means are generally provided for admitting and discharging the material and the air into and out of the chamber. Normally, when the air is exhausted from the chamber, it carries with it some of the particles of material being treated; therefore, dust collectors are provided for separating the particles of material from the air and collecting them for further processing.

According to the known state of the art, cyclone separators are ofttimes used for separating and collecting entrained particles from the exhausted air. Moreover, filtering units which include a plurality of tubular fabric collectors, have been used as well. Dust collectors of these types are remotely positioned with respect to the chamber, and they are operatively connected thereto by appropriate ducts. It has been found that remotely positioned collectors of this type have not always been entirely satisfactory because considerable space is required to house both the chamber and the dust collector; extensive ducts may be required to operatively connect the collector to the chamber; installations of this type are expensive to build and maintain; and optimum efficiency may be difficult to attain.

Accordingly, one object of the present invention is to provide an improved apparatus for treating pulverulent or granular material with a gaseous medium.

Another object is to provide an improved apparatus for heating and/or cooling pulverulent or granular material with a gaseous medium, such as air, which includes structure for collecting dust particles entrained in the air as the air is removed from the apparatus.

A further object is to provide a moistened material drying unit which includes a drying chamber and a dust collector.

Still another object is to provide a cooling unit for cooling heated particles of material which includes a cooling chamber and a dust collector.

A still further object is to provide an improved apparatus for drying and/or cooling particles of material which requires a minimum amount of installation space, which requires a minimum amount of structure, which is relatively inexpensive to build and maintain, and which operates with optimum efficiency.

Another object is to provide an improved method of treating pulverulent or granular material.

Other objects and advantages of the invention will become apparent from a consideration of the following specification and accompanying drawings. Before proceeding with a detailed description of the invention, a brief description of it will be presented.

Briefly, the apparatus includes a vertical cylindrically-shaped chamber having an inlet at its upper end for admitting material thereinto, a conically-shaped settling hopper positioned proximate the lower end of the chamber, and a dust collector which surrounds at least a portion of the cylindrical wall of the chamber. The dust collector includes a plurality of filter elements positioned therein, and the interior of the dust collector communicates with the interior of the settling hopper. A gaseous medium, such as air, is directed into the upper end of the chamber by appropriate means, and the air may be either heated or cooled. As particles of material are admitted into the upper end of the chamber they are heated or cooled by the air introduced into the chamber; and as the particles fall to the bottom of the apparatus they are either heated or cooled, dependent upon their initial temperature and the temperature of the air. The particles are discharged from the bottom of the hopper, and they may then undergo further processing operations; and the air is exhausted from the apparatus through the dust collector. As the air passes through the dust collector, particles entrained in the air are collected in the filter elements, and thus retained within the apparatus. At periodic intervals, the particles are dislodged from the filter elements by appropriate means and ultimately discharged from the settling hopper.

While the above description generally describes the apparatus whether it is used as a drier or as a cooler, it has been found that there may be times when it is desirable to use both a drier and a cooler in the processing of certain materials. Thus, the structure could include a first apparatus similar to that described above as a drier for drying moistened particles, and a second similar apparatus as a cooler for subsequently cooling the particles after they are discharged from the drier.

The invention will best be understood by reference to the following drawings, wherein:

FIGURE 1 is a schematic flow diagram illustrating apparatus for treating pulverulent or granular material;

FIG. 2 is an enlarged sectional view of a combined drier and dust collector unit;

FIG. 3 is a sectional view taken along line 3—3 of FIG. 2;

FIG. 4 is an enlarged sectional view of a combined cooler and dust collector unit;

FIG. 5 is a sectional view taken along line 5—5 of FIG. 4;

FIG. 6 is a top view of the duct shown in FIG. 2;

FIG. 7 is an enlarged top view of the duct shown in FIG. 4; and

FIG. 8 is a partial sectional view showing a portion of a dust collector.

For purposes of illustration, the present invention will be described in conjunction with the production of agglomerates or particles out of a pulverulent material such as flour. Flour, after being produced by a conventional milling process, is a dusty material, because of its fine particle size; it is not free flowing, consequently when it is poured, the flow is uneven, and often the flour will splash out of the respectacle; it is not readily wettable; and it is difficult to disperse in liquid. A number of other materials have similar characteristics, such as carbon black, dried milk powder, and cocoa powder; therefore, it is envisioned that the present invention might be used as part of the equipment for producing agglomerates or particles out of materials of this type as well.

It has been found that an improved flour product can be formed by moistening flour particles with a wetting agent, such as water, and thereafter mixing the particles and the wetting agent together to form a mass of wet agglomerates or particles having a relatively high moisture content. The agglomerates must thereafter be dried by appropriate means so as to reduce the moisture level, and thereafter sized or classified, packaged, and the like. The invention described herein pertains to structure which can be used for treating the moistened agglomerates after they have undergone a mixing or blending operation.

In FIGURE 1, a pulverulent material, such as flour, is fed from a storage container or bin 10 to a feeder 12, from which it is admitted into an agglomerator 14, also referred to as a mixing and blending apparatus. A wetting agent, such as water, is introduced into the agglomerator 14 through one or more nozzles 16. Positioned directly below the agglomerator 14 (for example on a lower floor) is a drier-dust collector unit designated generally by reference numeral 18; the unit 18 includes a cylindrically-shaped drying chamber 20, a conically-shaped settling hopper 22, and a dust collector 24 which surrounds a portion of the chamber 20. Positioned below the drier-dust collector unit 18 (for example on still another floor) is a cooler-dust collector unit designated generally by reference numeral 26. The unit 26 includes a cylindrically-shaped cooling chamber 28, a conically-shaped settling hopper 30, and a dust collector 32 which surrounds a portion of the chamber 28.

FIG. 2 illustrates the drier-dust collector unit 18 in greater detail. The drying chamber 20 is vertically oriented, and it is provided with an opening 34 at its upper end, through which material to be dried is admitted. The agglomerator 14 is positioned above the opening 34 and it includes a beater assembly 36, which not only admixes the flour and the wetting agent together, but it also aids in distributing and dispersing the material into the drying chamber 20. A deflector unit 42, formed from two conically-shaped members connected together, is attached to the upper end of the chamber 20 by hangers 44 so that it is directly below the opening 34. If desired, the deflector 42 can be raised or lowered by means of the hangers 44. The lower end of the chamber 20 forms a baffle 38 which converges toward the axis of the chamber, and it forms an unobstructed opening 40.

The conically-shaped settling hopper 22 is positioned below the lower end of the chamber 20, so that material which passes through the opening 40 is collected in the hopper 22. An opening 46 is provided in the bottom of the hopper 22 for discharging material therefrom, and an air-lock valve 48 (not shown in detail) controls the flow of material through the opening 42.

The dust collector 24 surrounds the lower portion of the drying chamber, and it includes a continuous wall or shell 50 which forms an annular chamber 52 around the chamber 20. The bottom of the wall 50 is connected to the top of the hopper 22 to form a continuous seam 54. As noted in FIG. 2, the lower end of the baffle 38 is spaced a prescribed distance $d$ from the wall of the hopper 22 thereby forming a passage, and the inside of the dust collector 24 communicates with the inside of the hopper 22 through this passage. The upper portion of the dust collector includes an elliptical casing or plenum 56 (note FIG. 3), provided with openings 58. Ducts 60 are attached to the casing 56 by appropriate means, and suction fans 62 are mounted at the top of the dust collector 24 for drawing air through the dust collector and forcing it through the ducts 60.

As depicted in FIGS. 3 and 8, the interior of the dust collector 24 is partitioned into a plurality of individual compartments or units by a number of elongate partitions or dividers 64, and a plurality of tubular filter elements 66 are positioned within each compartment. Each element includes a bag type filter 67, a tubular end piece 68, and a support member 69. The end piece 68 is mounted within the dust collector 24 by appropriate means so that the longitudinal axis of each filter element 66 is parallel to the longitudinal axis of the drying chamber 20. Each filter element 66 is formed of a porous fabric material, the walls of the elements being preferably constructed from a durable textile fabric of the required porosity. Compressed air can be introduced into the end pieces 68 and the filter bag 67 by means of nozzles 70 which are connected to a source of compressed air (not shown in the drawings). Solenoid valves 71 control the flow of compressed air into the bags 67.

A duct 72 is provided for admitting heated air into the drying chamber. The duct 72 enters the unit 18 through an opening 74 in the settling hopper 22, it projects through the opening 40 of chamber 20 and extends longitudinally within the chamber 20, and it terminates near the upper end of the drying chamber 20. A louvered end piece 76 is attached to the top end of the duct 72 for deflecting the air as it is admitted into the chamber, and imparting to the air a swirling motion, thereby aiding in proper distribution of the air. If desired, the angle of the louvers might be adjustable. A blower 78 is operatively connected to the other end of the duct 72 and a hot air generator 80 is operatively connected to the blower 78.

Different duct arrangements might be used for admitting the air into the chamber 20. For example, it is envisioned that air might be admitted into the chamber 20 by means of a duct projecting through the upper portion of the chamber 20, or the wall of the chamber. It is preferred however, that the air be introduced so that it is admitted somewhat against the downward flow of the material. Another modification which might be desirable would be to provide means for raising and lowering the upper portion of the duct 72 so that the distance between the top of the duct and the top of the chamber might be varied. In some instances it might be desirable to insulate the chamber 20, as well as the hopper 22 and the dust collector 24, in order to conserve the heat within the apparatus and to provide for more efficient operation.

The cooler-dust collector unit 26 is shown in greater detail in FIG. 4, and it is quite similar to the drier-dust collector unit 18. It should be realized of course, that the unit 18 which has already been described, could be used as a cooler rather than a drier, by minor modifications. In some installations however, it may be preferable to use both a drier and a cooler; therefore, both units will be described herein.

The cooling chamber 28 is likewise vertically oriented, and it is provided with an opening 81 at its upper end, through which material to be cooled is admitted. At this point, it might be pointed out that the units 18 and 26 are vertically oriented so that the particles of material admitted at the top of the chambers 20 and 28 fall to the bottom by means of gravity. This vertical arrangement eliminates the necessity of providing a special conveying system, such as a pneumatic system, for the sole purpose of moving the particles of material through the drying and cooling systems. In other words, under most operating conditions, the units 18 and 26 will operate just as well with a maximum load as with a smaller load, and not get into air velocity and conveying difficulties.

As shown in FIG. 4, the settling hopper 22 of the unit 18 is positioned directly above the cooler and particles of material are discharged therefrom directly into the cooling chamber. A baffle 82 is formed at the lower end of the chamber 26, and it forms an unobstructed opening 84 which permits the particles to pass through the chamber 28 into the conically-shaped settling hopper 30, positioned underneath the lower end of the chamber 28. An opening 86 and an air-lock valve 88 are provided for removing the material from the hopper 30.

The dust collector 32 surrounds a portion of the cooling chamber 28, and it includes a continuous wall or shell 90, which forms a chamber or compartment 92 around the chamber 28. The bottom of the wall 90 is connected to the top of the hopper 30 to form a seam or joint 94, and the interior of the dust collector 32 communicates with the interior of the hopper 30. The upper portion of the dust collector includes a casing or plenum 96 (note FIG. 5), which communicates with the chamber 92 through an opening 98. Duct 100 is attached to the casing 96 by appropriate means, and a suction fan 102 draws material through the dust collector 32 and forces it through the duct 100. The interior of the dust collector 32 is partitioned into a plurality of compartments by a number of elongate partitions or dividers 104, and a plurality of tubular filter elements 106, similar to the filter elements 66, are positioned within each compartment in a similar manner as the filter elements 66.

A duct 108 is provided for admitting cooled air into the drying chamber. The duct 108 enters the structure through an opening 110 in the settling hopper 30, it projects through the opening 84 and extends longitudinally within the cooling chamber 28, and it terminates near the upper end of the chamber 28. A louvered deflector unit 112 is attached to the upper end of the duct 108 for deflecting the air as it is admitted into the chamber 28, and imparting to it a swirling motion. Rotatably mounted on the top of the deflector unit 112 is a distributor 114 for dispersing the material as it is admitted into the chamber 28 through the opening 81. The distributor 114 includes a plate 115 and a number of blades 116, and it is preferably rotated at high speed by a motor 118, so as to throw the material outwardly with centrifugal force toward the walls of the chamber 28.

A blower 120 is operatively connected to the other end of the duct 108 for forcing air into the duct. In some instances it might be desirable to eliminate the blower 120, and merely expose the lower end of the duct 108 to the ambient air surrounding the apparatus. Appropriate filter means (not shown) could also be provided for filtering the ambient air before it is admitted into the cooling chamber. If the blower 120 is eliminated, it might be desirable to increase the negative pressure created by the suction fan 102 to assure adequate flow of cool air through the duct 108.

In operation, material to be processed, such as flour, is fed from the storage bin 10 to the agglomerator 14 where it is mixed and blended with a wetting agent such as water to form moistened agglomerates or particles. The moistened particles are discharged directly from the agglomerator through the opening 34 into the top of the drying chamber 20. The beater assembly 36 of the agglomerator is rotated at a relatively high speed; the beater and the upper surface of the deflector 42 cause the particles to be thrown outwardly toward the inner surface of the chamber wall. Heated air is directed into the upper portion of the drying chamber through the duct 72, and it is deflected toward the wall of the chamber by the louvered end piece 76, as well as the lower surface of the deflector 42. The heated air surrounds the moistened particles, and as the particles and the heated air pass downwardly toward the opening 40, the moisture content of the particles is substantially reduced.

As the particles and the air pass through the chamber 20, they must be removed therefrom. A major portion of the dried particles pass through the opening 40 and are collected in the settling hopper 22, from which they are discharged by means of the air-lock valve 48. The heated air on the other hand, also passes through the opening 40, but it is sucked through the dust collector 24 and forced through the ducts 60 by the suction fans 62. Some of the particles, especially the smaller ones, remain entrained in the air as the air passes through the dust collector. By controlling the distance $d$, which defines the size of the passage formed between the baffle 38 and the hopper 22, and the negative pressure created by the fans 62, the number of particles withdrawn with the air can be limited to some extent. As the air flows through the dust collector 24, it passes through the filter elements 66 in such a manner that the particles which are entrained in the air, are collected on the outer surface of the filter elements 66. If desired, the filter elements can then be removed from the dust collector 24, or the particles can be dislodged by energizing the solenoid valve 71 so that compressed air is injected through the end piece 68 into the filter element. The dislodged particles settle in the hopper 22, from which they can then be removed. It should be realized of course that if desired, the dust collector could be designed so that the particles are collected on the inner surface of the filter as well.

The particles are discharged from the settling hopper 22 through the opening 81 into the top of the cooling chamber 28. As they flow into the chamber 28, the particles are dispersed toward the wall of the chamber by the rotating distributor 114. Cooled air is directed into the upper portion of the chamber 28 through the duct 108, and it is deflected toward the wall of the chamber 112. The cooled air surrounds the heated particles, and as they pass downwardly toward the opening 84, they are rapidly cooled to a prescribed temperature range. As the particles and the cooled air pass through the chamber 28 they are removed therefrom in much the same manner as that described hereinbefore, in connection with the heated air and particles in the drying chamber 20. In other words, most of the particles settle in the settling hopper 30, from which they are discharged, and the air is exhausted through the dust collector 32, in which particles entrained in the air are collected.

The moisture content of the dried particles depends to a large extent upon the length of time that the particles are in the drier. The desired residence time in turn depends upon such factors as the initial moisture content of the particles, the desired moisture content of the dried particles, the temperature of the heated air, the velocity of the heated air, the size of the apparatus, etc. The following ranges are given merely to indicate certain ranges in which satisfactory drying might be attained. Generally, the residence time of the particles in the drier should be less than 1 minute; the temperature of the heated air might vary from 100–400° F., depending upon the available equipment and the type of material being dried; the velocity of the heated air might vary from 40–60 feet per second; and the temperature of the particles after they have been dried might vary from about 100–140° F. Moreover, by utilizing a relatively low exhaust velocity at $d$, e.g., less than 3 feet per second, the heated air can be removed without withdrawing too many particles.

The temperature of the cooled particles likewise depends to a large extent upon the length of time that the particles are in the cooler. The length of time that the particles are retained in the cooler depends upon the initial temperature of the dried particles, the desired temperature of the cooled particles, the temperature of the cooled air, the velocity of the cooled air, the size of the equipment, and the like. Generally the residence time is less than that required for drying, although it too, should generally be less than 1 minute. The temperature of the cooled air is normally room temperature, which might vary from about 65° to 90° F.; the velocity of the cooled air might vary from 40–60 feet per second; and the desired temperature of the cooled product might vary from 70° to 90° F. It should be realized of course that the temperature of the cooled air might be considerably lower than room temperature for some applications, and that in some instances refrigerated air might even be used.

For purposes of illustration, heated air having a temperature of about 330° F. and a velocity of about 50 feet per second, was introduced into the chamber 20 through the duct 72. The length of the chamber 20 was about 15 feet and its diameter was about 8 feet. Particles having a moisture content of about 25% were admitted into the chamber 20 through the opening 34. The particles were dried to a moisture level of about 15% with a particle residence time of less than 10 seconds. The temperature of the dried particles after they passed through the opening 40 was about 125° F.

Cooled air, which was admitted into the cooling chamber 28 through the duct 108, had a temperature of about 70° F. and a velocity of about 50 feet per second. The size of the chamber 28 was about the same as the chamber 20. The heated particles which were discharged from the settling hopper 22 were cooled from a temperature of about 125° F. to about 80° F. by the time they passed through the opening 84, the total residence time being less than 10 seconds.

The above described structure might be used only for drying pulverulent material; it might be used only for cooling pulverulent material; or it might be used for first drying the material and thereafter cooling it, as illustrated in FIGURE 1. Regardless of its use, appropriate means should be provided for separating particles of the material from the gaseous medium. It has been found that a combined drier and dust collector, or a combined cooler and dust collector, results in improved processing equipment having numerous advantages over the known prior art.

In the above description and attached drawings, a disclosure of the principles of this invention is presented, together with some of the embodiments by which the invention may be carried out.

Now therefore, I claim:

1. Apparatus for treating particles of material comprising a chamber having an upper end and a lower end, first means for admitting material into the upper portion of said chamber so that the particles are directed in a downward direction, the lower end permitting said material to pass freely through the chamber, a settling hopper, means for positioning said hopper below the lower end of the chamber so that the material can pass from said chamber into said hopper, means for discharging said material from said hopper, second means for directing a gaseous medium into the upper portion of the chamber so that said gaseous medium is caused to intersect with the particles of material as they flow downwardly, a dust collector unit, and means for positioning said unit relative to the chamber so that it surrounds said chamber, the interior of said unit communicating with the interior of the settling hopper.

2. The combination of claim 1 wherein the chamber forms a drying chamber for drying moistened material, a source for heating air to a prescribed temperature is provided, and the means for admitting the gaseous medium into said chamber is operatively connected to said source so that heated air is admitted into the upper portion of the chamber.

3. The combination of claim 1 wherein the chamber forms a cooling chamber for cooling material to a prescribed temperature, a source of cooled air is provided, and the means for admitting the gaseous medium into said chamber is operatively connected to said source so that cooled air is admitted into the chamber.

4. The combination of claim 1 wherein distributing means is provided adjacent the first means for dispersing the material as it is admitted into the upper end of the chamber.

5. The combination of claim 1 wherein the means for admitting the gaseous medium into the chamber includes a duct which projects through the settling hopper and extends longitudinally within the chamber toward the upper end of said chamber, thereby directing the gaseous medium into the upper portion of the chamber.

6. Apparatus for treating particles of material comprising a vertically oriented drying chamber having upper and lower ends, first means for admitting particles into the upper end of said chamber and directing said particles in a downward direction, outlet means for discharging said particles from the lower end of said chamber, second means for introducing a heated gaseous medium into the upper portion of said chamber, a vertically oriented cooling chamber having upper and lower ends, first means for admitting particles into the upper end of said cooling chamber and directing said particles in a downward direction, means for positioning said cooling chamber relative to the drying chamber so that said particles are discharged from the bottom of the drying chamber into the upper end of the cooling chamber, outlet means for discharging said particles from the lower end of the cooling chamber, and second means for introducing a cooling gaseous medium into the upper portion of said cooling chamber.

7. A process of treating particles of material which comprises admitting moistened particles into the upper end of a vertical drying unit, introducing a heated gaseous medium into said upper end, drying the particles by contacting them with the heated gaseous medium as said particles and said medium pass downwardly through the drier, removing the gaseous medium from the lower end of the drying unit, filtering the gaseous medium and collecting particles entrained therein from the medium before said medium passes through the unit, discharging the dried particles from the bottom of the drier into the upper end of a vertical cooling unit positioned below the drier, introducing a cooling gaseous medium into said upper end, cooling the particles by contacting them with the cooled gaseous medium as said particles and said medium pass downwardly through the cooling unit, removing the cooling gaseous medium from the lower end of the cooling unit, filtering the gaseous medium and collecting particles entrained therein from the medium before said medium passes through the unit, and discharging the cooled particles from the bottom of the cooling unit.

8. The process of claim 7 wherein particles entrained in the heated and cooled gaseous mediums are collected in filtering units which surround the drying and cooling units.

9. The process of claim 7 wherein the moisture content of the particles is reduced from about 25% to about 15% in less than 1 minute.

10. The process of claim 7 wherein the temperature of the heated particles is reduced from about 100–140° F. to about 70–90° F. in the cooler, in less than 1 minute.

11. Apparatus for treating particles of material comprising a chamber having an upper end and a lower end, said chamber forming a cooling chamber for cooling material to a prescribed temperature, inlet means for admitting material into the upper portion of said chamber, the lower end permitting said material to pass freely through the chamber, a settling hopper, means for positioning said hopper below the lower end of the chamber so that the material can pass from said chamber into said hopper, means for discharging said material from said hopper, means for directing a gaseous medium into the upper portion of the chamber, a dust collector unit, means for positioning said unit relative to the chamber so that it surrounds said chamber, the interior of said unit communicating with the interior of the settling hopper, a source of cooled air, said source of cooled air being the ambient air, means for causing said ambient air to flow into the chamber, filter means for filtering said ambient air before it is admitted into the chamber, and the means for admitting the gaseous medium into said chamber is operatively connected to the source of cooled air so that cooled air is admitted into the chamber.

12. Apparatus for treating particles of material comprising a drying chamber having upper and lower ends, inlet means for admitting particles into the upper end of said chamber, outlet means for discharging said particles from the lower end of said chamber, means for introducing a heated gaseous medium into the upper portion of said chamber, a first dust collector for removing the gaseous medium from the lower end of the drying chamber and for collecting dust particles entrained in said medium, means for mounting said collector relative to the drying chamber so that it surrounds said chamber and forms a part thereof, the interior of said collector communicating with the interior of the lower portion of the chamber so that the gaseous medium can pass from the drying chamber into the dust collector, a cooling chamber having upper and lower ends, inlet means for admitting particles into the upper end of said cooling chamber, means for positioning said cooling chamber relative to the drying chamber so that said particles are discharged from the bottom of the drying chamber into the upper end of the cooling chamber, outlet means for discharging said particles from the lower end of the cooling chamber, means for introducing a cooling gaseous medium into the upper portion of said cooling chamber, a second dust collector for removing the gaseous medium from the lower end of the cooling chamber and for collecting dust particles entrained in said medium, and means for mounting said collector relative to the cooling chamber so that it surrounds said chamber and forms a part thereof, the interior of said second collector communicating with the interior of the lower portion of the cooling chamber so that the gaseous medium can pass from the cooling chamber into the second dust collector.

13. Apparatus for treating particles of material comprising a drying chamber having upper and lower ends, inlet means for admitting particles into the upper end of said chamber, outlet means for discharging said particles from the lower end of said chamber, means for introducing a heated gaseous medium into the upper portion of said chamber, a cooling chamber having upper and lower ends, inlet means for admitting particles into the upper end of said cooling chamber, means for positioning said cooling chamber relative to the drying chamber so that said particles are discharged from the bottom of the drying chamber into the upper end of the cooling chamber, outlet means for discharging said particles from the lower end of the cooling chamber, and means for introducing a cooling gaseous medium into the upper portion of said cooling chamber, and distributing means are provided adjacent the inlet means of at least one of said chambers for dispersing the material as it is admitted into the upper end of said one chamber.

References Cited

UNITED STATES PATENTS

| | | | |
|---|---|---|---|
| 296,042 | 5/1884 | Niese et al. | 34—10 |
| 2,715,282 | 8/1955 | Niven | 34—66 X |
| 3,145,975 | 8/1964 | Towns | 34—57 X |
| 3,262,213 | 7/1966 | Austin et al. | 34—10 |
| 3,311,993 | 4/1967 | Bersano | 34—57 |

FOREIGN PATENTS 452,714    10/1949    Italy.

CHARLES J. MYHRE, *Primary Examiner.*